United States Patent
Deng et al.

(10) Patent No.: US 11,745,598 B2
(45) Date of Patent: Sep. 5, 2023

(54) MAGNETIC WHEEL DRIVING DEVICE AND DRIVING METHOD USING SAME

(71) Applicant: Southwest Jiaotong University, Chengdu (CN)

(72) Inventors: Zigang Deng, Chengdu (CN); Kaiwen Li, Chengdu (CN); Xin Liu, Chengdu (CN); Hongfu Shi, Chengdu (CN); Le Liang, Chengdu (CN); Jun Zheng, Chengdu (CN)

(73) Assignee: Southwest Jiaotong University, Chengdu (CN)

( * ) Notice: Subject to any disclaimer, the term of this patent is extended or adjusted under 35 U.S.C. 154(b) by 0 days.

(21) Appl. No.: 18/179,965

(22) Filed: Mar. 7, 2023

(65) Prior Publication Data
US 2023/0219425 A1    Jul. 13, 2023

(30) Foreign Application Priority Data
Jun. 9, 2022   (CN) .......................... 202210645808.X

(51) Int. Cl.
| | | |
|---|---|---|
| *B60L 13/10* | (2006.01) | |
| *B61B 13/08* | (2006.01) | |
| *B60B 19/00* | (2006.01) | |

(52) U.S. Cl.
CPC ............ *B60L 13/10* (2013.01); *B60B 19/006* (2013.01); *B61B 13/08* (2013.01); *B60L 2200/26* (2013.01)

(58) Field of Classification Search
CPC .... B60L 13/10; B60L 2200/26; B60B 19/006; B61B 13/08
See application file for complete search history.

(56) References Cited

U.S. PATENT DOCUMENTS

2003/0192449 A1    10/2003   Fiske et al.

FOREIGN PATENT DOCUMENTS

| AU | 3138501 A | 10/2002 | |
|---|---|---|---|
| CN | 105142971 A | 12/2015 | |
| CN | 109228883 A | 1/2019 | |
| CN | 109484385 A | 3/2019 | |
| CN | 109955725 A | * 7/2019 | .............. B60L 13/10 |
| CN | 109955725 A | 7/2019 | |
| CN | 209159438 U | 7/2019 | |
| CN | 210478412 U | 5/2020 | |

(Continued)

OTHER PUBLICATIONS

Shan Chong et al., "Error Correction Technology with Adaptive Timeslot Synchronization for Magnetic-inducted Marker Sensors", Instrument Technique and Sensor, 2016, No. 9, pp. 79-81.

(Continued)

*Primary Examiner* — Robert J McCarry, Jr.

(57) ABSTRACT

A magnetic wheel driving device and a driving method using the same. The magnetic wheel driving device includes a vehicle body, a guide rail system, at least two magnetic wheel systems and a power system. The guide rail system includes two conductor plates, respectively arranged at two sides of the vehicle body. The at least two magnetic wheel systems are symmetrically arranged at two side walls of the vehicle body. A gap is provided between each magnetic wheel system and the corresponding conductor plate. The power system is configured to drive the at least two magnetic wheel systems to rotate.

4 Claims, 3 Drawing Sheets

(56) References Cited

FOREIGN PATENT DOCUMENTS

| CN | 111942163 | A | 11/2020 |
| CN | 113415169 | A | 9/2021 |
| JP | 2019004678 | A | 1/2019 |

OTHER PUBLICATIONS

Jiangchao Wang et al., "The Suspended and Driving Systems of German Maglev Vehicle", Foreign Rolling Stock, vol. 41, No. 3, 2004, pp. 1-5.

* cited by examiner

MAGNETIC WHEEL DRIVING DEVICE AND DRIVING METHOD USING SAME

CROSS-REFERENCE TO RELATED APPLICATIONS

This application claims the benefit of priority from Chinese Patent Application No. 202210645808.X, filed on Jun. 9, 2022. The content of the aforementioned application, including any intervening amendments thereto, is incorporated herein by reference in its entirety.

TECHNICAL FIELD

The present application relates to magnetic levitation (maglev) trains, and more particularly to a magnetic wheel driving device and a driving method using the same.

BACKGROUND

The existing magnetic levitation (maglev) vehicles are generally driven by various linear motors, such as long-stator linear synchronous motor (LSLSM) and short-stator linear induction motor. Regarding the LSLSM, its excitation control system needs to consider many factors, and has a complex control strategy. In addition, for the LSLSM, it is required to build a long-stroke primary winding, which leads to a high cost. The short-stator linear induction motor struggles with low efficiency and poor thrust force.

SUMMARY

To overcome the above-mentioned defects, the present disclosure provides a magnetic wheel driving device and a driving method using the same.

Technical solutions of the disclosure are described as follows.

In a first aspect, this present disclosure provides a magnetic wheel driving device, comprising:
  a vehicle body;
  a guide rail system;
  at least two magnetic wheel systems; and
  a power system;
  wherein the guide rail system comprises two conductor plates; and one of the two conductor plates is arranged at a first side of the vehicle body, and the other of the two conductor plates is arranged at a second side of the vehicle body;
  the at least two magnetic wheel systems are symmetrically arranged at two side walls of the vehicle body; and a gap is provided between each of the at least two magnetic wheel systems and a corresponding conductor plate of the two conductor plates;
  the power system is configured to drive the at least two magnetic wheel systems to rotate.

In some embodiments, each of the at least two magnetic wheel system comprises a wheel hub and a permanent magnetic wheel; the wheel hub is arranged parallel to ground; an inner ring of the wheel hub is rotatably connected to the vehicle body; and the permanent magnetic wheel is arranged on an outer ring of the wheel hub.

In some embodiments, the permanent magnetic wheel comprises a plurality of permanent magnets; and the plurality of permanent magnets are arranged in a circular Halbach period array according to a magnetization direction.

In some embodiments, the number of the plurality of permanent magnets is 16; and along a clockwise direction, a magnetization direction of the latter of two adjacent permanent magnets is set by rotating clockwise a magnetization direction of the former of two adjacent permanent magnets by 90°.

In some embodiments, the power system comprises a motor and a transmission assembly; the motor is arranged inside the vehicle body; the motor is rotatably connected to the at least two magnetic wheel systems through the transmission assembly; and among the at least two magnetic wheel systems, a magnetic wheel system at one side wall of the vehicle body has a rotation direction opposite to that of a magnetic wheel system at the other side of the vehicle body.

In some embodiments, the number of the motor is two; one of the two motors is opposite to the other of the two motors in rotation direction; the transmission assembly is a transmission shaft; one end of the transmission shaft is fixedly connected to an output shaft of each of the motors; and the other end of the transmission shaft is fixedly connected to each of the at least two magnetic wheel systems.

In a second aspect, this present disclosure provides a maglev train driving method based on the above-mentioned magnetic wheel driving device, comprising:
  (a) receiving a first control command, wherein the first control command comprises a command for controlling the power system to start;
  (b) sending a second control command in response to the first control command, wherein the second control command comprises a command for energizing the power system; and after the power system is energized, driving the at least two magnetic wheel systems to rotate; wherein during rotation, the at least two magnetic wheel systems act together with the two conductor plates to generate a driving force to drive the vehicle body to move;
  (c) detecting a speed of the vehicle body; if the speed reaches a preset speed, sending a third control command, wherein the third control command comprises a command for adjusting a rotation speed of the at least two magnetic wheel systems to allow the vehicle body to make a uniform motion at the preset speed; and
  (d) detecting a distance between a position of the vehicle body and a preset deceleration point; if the vehicle body reaches the preset deceleration point, sending a fourth control command, wherein the fourth control command comprises a command for reducing the rotation speed of the at least two magnetic wheel systems to a preset rotation speed to stop the vehicle body at a preset stop point.

In some embodiments, step (b) further comprises:
  rotating the permanent magnetic wheel of each of the at least two magnetic wheel systems to allow each of the two conductor plates to generate an induced eddy current; generating, by the induced eddy current, a mirror-image magnetic field having an opposite direction to a rotating magnetic field of the permanent magnet wheel; and generating, by the mirror-image magnetic field and the rotating magnetic field, the driving force to drive the vehicle body to move.

In some embodiments, step (c) further comprises:
  adjusting the rotation speed of the at least two magnetic wheel systems to accelerate the vehicle body to the preset speed; and
  the vehicle body is accelerated through steps of:
  adjusting the rotation speed of the at least two magnetic wheel systems such that an equivalent linear speed of each of the at least two magnetic wheel systems is greater than a horizontal motion speed of the vehicle body, wherein rotation of the permanent magnet wheel allows each of the two conductor plates to generate the induced eddy current; the induced eddy current generates the mirror-image magnetic field having an opposite direction to a rotating magnetic field of the permanent magnet wheel; the mirror-image magnetic field and the rotating magnetic field together generate the driving force greater than zero to make the vehicle body in an acceleration state.

In some embodiments, the uniform motion of the vehicle body is performed through steps of:

adjusting the rotation speed of the at least two magnetic wheel systems such that the equivalent linear speed of each of the at least two magnetic wheel systems is equal to the horizontal motion speed of the vehicle body, wherein in this case, the driving force generated by the mirror-image magnetic field and the rotating magnetic field is zero, thereby realizing the uniform motion of the vehicle body.

In some embodiments, in step (d), the command for "reducing the rotation speed of the at least two magnetic wheel systems to a preset rotation speed to stop the vehicle body at a preset stop point" is performed through steps of:

reducing an output rotation speed of the power system to allow the equivalent linear speed of the at least two magnetic wheel systems to be smaller than the horizontal motion speed of the vehicle body, wherein in this case, the driving force generated by the mirror-image magnetic field and the rotating magnetic field is converted into a braking force to decelerate the vehicle body until the vehicle body stops at the preset stop point.

Compared to the prior art, this application has the following beneficial effects.

(1) By means of the motors, the magnetic wheel systems can be driven to rotate at a preset speed, leading to easy control. The magnetic wheel systems are arranged on the vehicle body, and the conductor plates are respectively arranged at two sides of the vehicle body, which significantly reduce the construction costs compared to the primary winding for long-distance guide rails.

(2) The braking force of the magnetic wheel is converted into a driving force to drive the vehicle body to move, and moreover, the magnetic wheel can provide a great driving force at a low rotation speed and a low motor power. In terms of the energy loss, the driving device provided herein merely leads to additional eddy-current loss compared to normal asynchronous motors. The magnetic wheel driving device provided herein has over 90% working efficiency, contributing to a great driving force and high efficiency.

Other features and advantages of the present disclosure will be described below, and will be partly apparent from the following description or understood based on the embodiments of the present disclosure. The objects and other advantages of the present disclosure may be realized and obtained by means of the structure specially indicated in the description, claims and drawings.

BRIEF DESCRIPTION OF THE DRAWINGS

The accompany drawings needed in the description of the embodiments of the disclosure will be briefly described below to explain the technical solutions of the present disclosure more clearly. Obviously, presented in the accompany drawings are merely some embodiments of the present disclosure, and other drawings can be obtained by those skilled in the art based on the drawings provided herein without paying creative effort.

Figure 1:
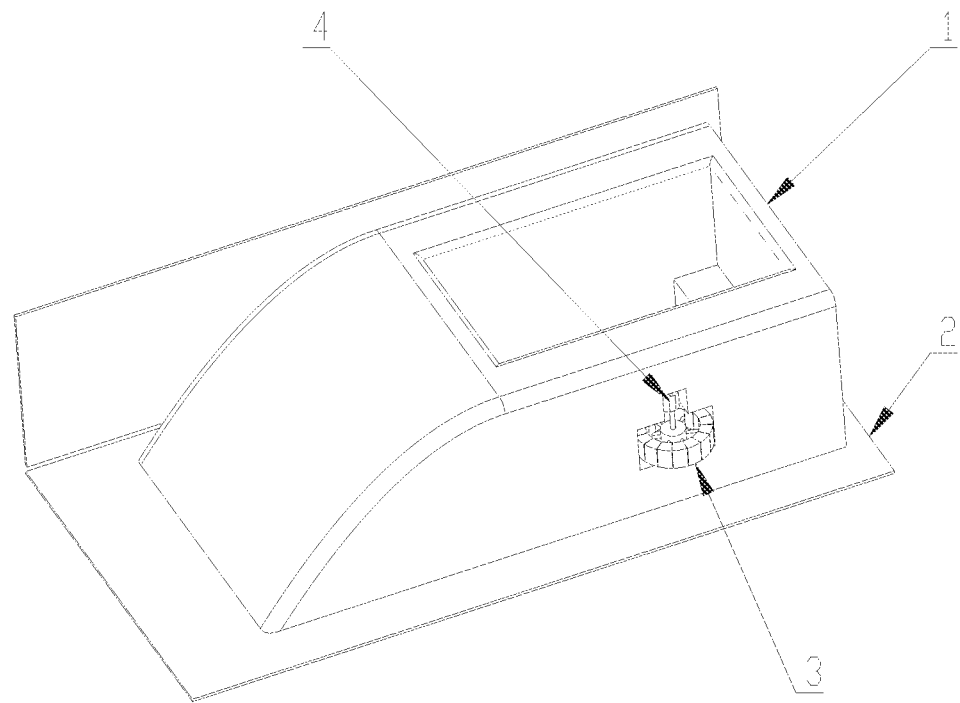
FIG. 1 schematically shows a structure of a magnetic wheel driving device according to an embodiment of the present disclosure.

In the drawings, 1, vehicle body; 2, guide rail system; 21, rail; 22, conductor plate; 3, magnetic wheel system; 31, wheel hub; 32, permanent magnetic wheel; 321, permanent magnet; 4, power system; 41, motor; 42, transmission assembly; and 421, connecting key.

DETAILED DESCRIPTION OF EMBODIMENTS

The disclosure will be described completely and clearly below with reference to the accompanying drawings and embodiments to make the object, technical solutions, and beneficial effects of the present disclosure clearer. Obviously, provided below are merely some embodiments of the disclosure, which are not intended to limit the disclosure. The components described and illustrated in the drawings can be arranged and designed in various configurations. Therefore, the embodiments provided in the accompanying drawings are merely illustrative, and are not intended to limit the scope of the present disclosure. Based on the embodiments of the present disclosure, all other embodiments obtained by those skilled in the art without paying any creative effort shall fall within the scope of the present disclosure.

It should be noted that similar reference numerals or letters indicate similar elements in the following drawings. Therefore, once a certain element is defined in one drawing, it does not need to be further defined and explained in subsequent drawings. At the same time, as used herein, the terms "first", "second", etc. are only used to distinguish the elements referred to, and cannot be understood to indicate or imply relative importance.

Generally, the existing magnetic levitation vehicles are driven by various linear motors, mainly including LSLSM and short-stator linear synchronous motor. Regarding the LSLSM, the magnitude and direction of the current of the stator pole winding is adjusted to generate a traveling magnetic field, which interacts with an on-board rotor winding to achieve traction. During operation, the long-stator winding is segmentedly energized, leading to many consideration factors and complex control strategy. Furthermore, a primary winding of the LSLSM is arranged on the rail, a secondary winding of the LSLSM is arranged on bottom of trains. For a long-distance transport of magnetic levitation trains, it is necessary to provide a long-distance primary winding, which is high cost. The short-stator linear synchronous motor has large air gap and extra loss inside the motor due to an end effect caused by core opening and breaking, which results in low efficiency and small propelling force.

Embodiment 1

Figure 2:
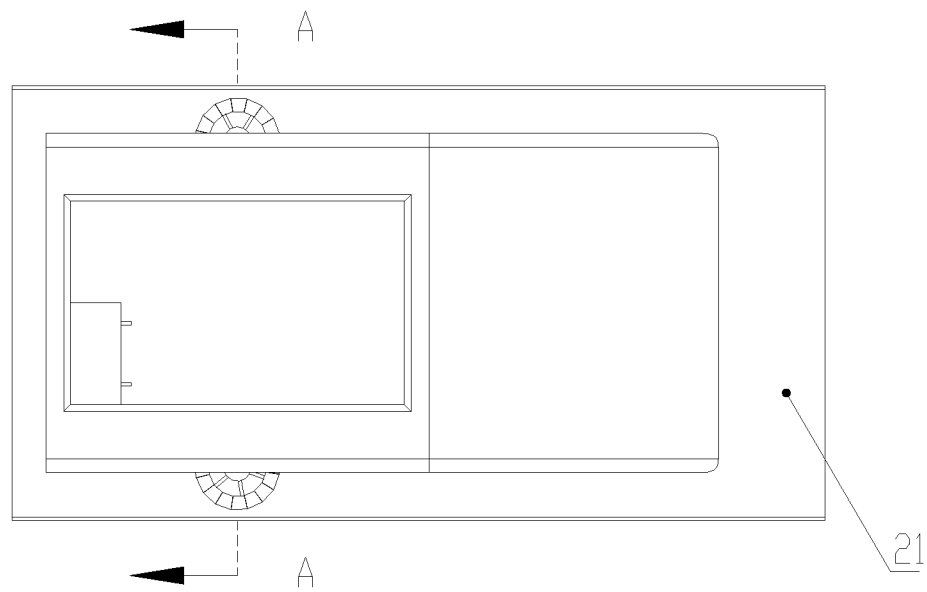
FIG. 2 is a top view of the magnetic wheel driving device according to an embodiment of the present disclosure.
Figure 3:
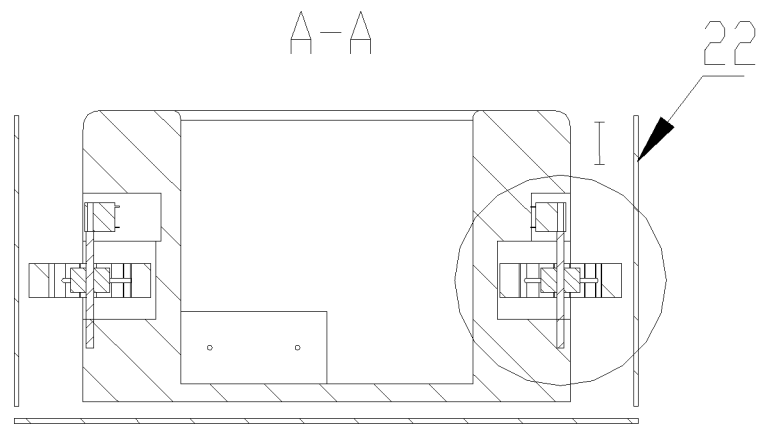
FIG. 3 is a section view of the magnetic wheel driving device according to an embodiment of the present disclosure along A-A line in FIG. 2.

Referring to FIGS. 1-3, a magnetic wheel driving device includes a vehicle body 1, a guide rail system 2, at least two magnetic wheel systems 3 and a power system 4. The guide rail system 2 includes two conductor plates 22. One of the two conductor plates 22 being arranged at a first side of the vehicle body 1, and the other of the two conductor plates 22 being arranged at a second side of the vehicle body 1. The magnetic wheel systems 3 are symmetrically arranged at two side walls of the vehicle body 1. A gap is provided between each of the magnetic wheel systems 3 and a corresponding conductor plate 22 of the two conductor plates. The power system 4 is configured to drive the magnetic wheel systems 3 to rotate. In this embodiment, the vehicle body 1 is arranged on the guide rail system 2. Multiple magnetic wheel systems 3 are provided, and symmetrically arranged at two side walls of the vehicle body 1. Each magnetic wheel system 3 forms a wheel-plate group with the corresponding conductor plate 22. The power system 4 drives the magnetic wheel systems 3 to rotate and adjust a rotation speed of the magnetic wheel systems 3, such that each of the magnetic wheel systems 3 and the corresponding conductor plate 22 can couple to realize accelerated motion, uniform motion and decelerated motion of the vehicle body 1.

Referring to FIG. 2, the number of the magnetic wheel systems 3 is two. The two magnetic wheel systems 3 are symmetrically arranged at two side walls of the vehicle body 1 to allow the vehicle body 1 being balanced by forces and making stable operation. The guide rail system 2 has a U-shaped structure. A rail 21 of the guide rail system 2 is arranged parallel to ground. The rail 21 is configured to provide a vertical magnetic levitation force upward from the ground for the vehicle body 1. Two conductor plates 22 are perpendicular to the ground, and are arranged respectively at two sides of the rail 21. Each of the magnetic wheel systems 3 is 10-40 mm away from the corresponding conductor plate 22, such that the conductor plates 22 can act together with the magnetic wheel systems 3 to generate the maximum driving force, leading to the maximum work efficiency.

Figure 4:
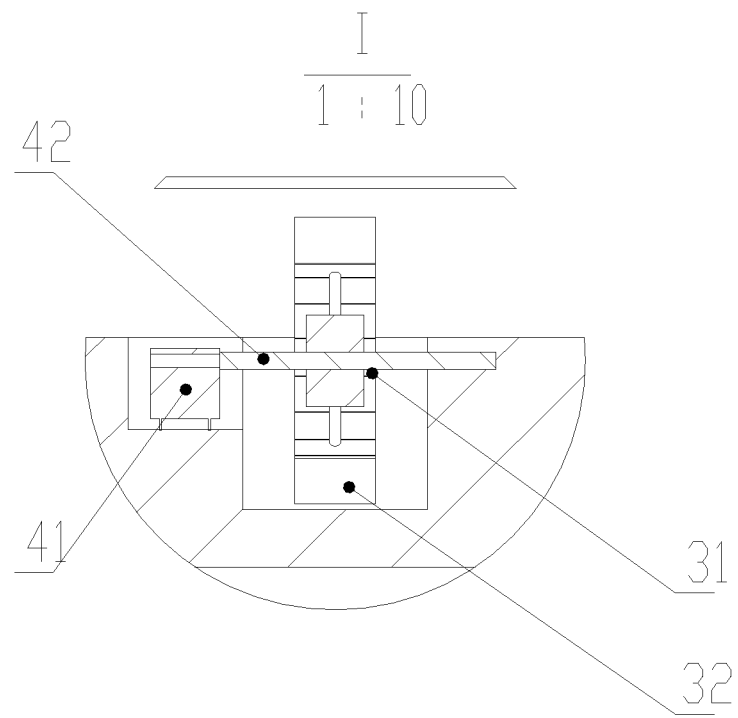
FIG. 4 is an enlarged view of Part I in FIG. 3.

Referring to FIG. 4, each of the magnetic wheel system 3 includes a wheel hub 31 and a permanent magnetic wheel 32. The wheel hub 31 is arranged parallel to the ground. An inner ring of the wheel hub 31 is rotatably connected to the vehicle body 1. The permanent magnetic wheel 32 is arranged on an outer ring of the wheel hub 31. It should be understood that such arrangement allows the magnetic field generated by the magnetic wheel system 3 to be horizontally distributed with respect to the ground, thereby avoiding generating a vertical force when the magnetic wheel systems 3 interact with the conductor plates 22, and ensuring the stable operation of the vehicle body 1.

Figure 5:
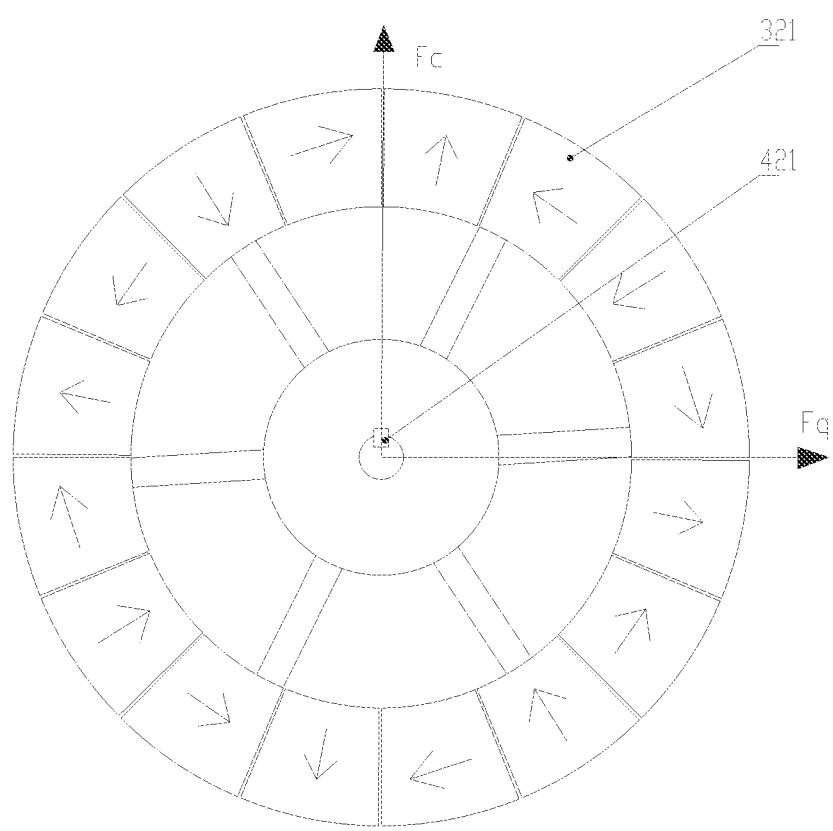
FIG. 5 schematically shows a structure of a magnetic wheel system of the magnetic wheel driving device according to an embodiment of the present disclosure.

Referring to FIG. 5, the permanent magnetic wheel 32 includes multiple permanent magnets 321. The permanent magnets 321 are arranged in a circular Halbach period array according to a magnetization direction. Such arrangement of magnet units enhances a field strength at a periphery of the permanent magnetic wheel 32, so as to allow the permanent magnetic wheel 32 to generate a stronger magnetic field with less permanent magnets.

In an embodiment, referring to FIG. 5, the number of the permanent magnets 321 is 16. Along a clockwise direction, a magnetization direction of the latter of two adjacent permanent magnets 321 is set by rotating clockwise a magnetization direction of the former of two adjacent permanent magnets 321 by 90°. Fc represents a yawing force. Fq represents a driving force. An arrow indicates the magnetization direction of the permanent magnets 321. It should be understood that the permanent magnets 321 arranged in a circular Halbach period array allow the conductor plates 22 to generate an induced eddy current. The induced eddy current generates a mirror-image magnetic field having an opposite direction to the rotating magnetic field of the permanent magnet wheel 32. The mirror-image magnetic field and the rotating magnetic field of the permanent magnet wheel 32 together generate the yawing force perpendicular to the conductor plate 22 pointing inside the vehicle body 1, and the driving force parallel to the vehicle body 1. Yawing forces on two opposite sides of the vehicle body 1 are counteracted, and driving forces on the two opposite sides propel the vehicle body together to allow the vehicle body 1 to realize accelerated motion, uniform motion and decelerated motion.

In an embodiment, referring to FIGS. 4-5, the power system 4 includes a motor 41 and a transmission assembly 42. The motor 41 is arranged inside the vehicle body 1. The motor 41 is rotatably connected to the magnetic wheel systems 3 through the transmission assembly 42. Among the at least two magnetic wheel systems 3, a magnetic wheel system 3 at one side wall of the vehicle body 1 has a rotation direction opposite to that of a magnetic wheel system 3 at the other side of the vehicle body 1. The controlled rotation of the motor 41 is transmitted through the transmission assembly 42 to drive the magnetic wheel systems 3 to rotate, in which the magnetic wheel systems 3 at one side have an opposite rotation direction to the magnetic wheel systems 3 at the other side. In consequence, the yawing force generated by the magnetic wheel systems 3 at the same side has an opposite direction to and is counteracted with the yawing force generated by the corresponding conductor plate 22; and the driving forces generated by the magnetic wheel systems 3 at the same side have the same direction to the driving force generated by the corresponding conductor plate 22, contributing to the maximum efficiency.

In an embodiment, two motors 41 having opposite rotation directions are provided. The transmission assembly 42 is a transmission shaft. One end of the transmission shaft is fixedly connected to an output shaft of each motor 41. The other end of the transmission shaft is fixedly connected to the magnetic wheel systems 3 through a connecting key 421. The two motors 41 can provide greater power for the magnetic wheel driving device. Furthermore, when one side motor 41 is failed, the magnetic wheel driving device can still work. Due to the transmission assembly 42, the power generated by the motors 41 has less power loss during power transmission.

Embodiment 2

Provided is a maglev train driving method based on the magnetic wheel driving device of Embodiment 1.

The driving method includes the following steps.

(a) A first control command is received, in which the first control command includes a command for controlling the power system 4 to start.

(b) A second control command is sent in response to the first control command, in which the second control command includes a command for energizing the power system 4. After the power system 4 is energized, the magnetic wheel systems 3 are driven to rotate, where during rotation, the magnetic wheel systems 3 act together with the conductor plates 22 to generate a driving force to drive the vehicle body 1 to move.

(c) A speed of the vehicle body 1 is detected. If the speed reaches a preset speed, a third control command is sent, in which the third control command includes a command for adjusting a rotation speed of the magnetic wheel systems 3 to allow the vehicle body 1 to make a uniform motion at the preset speed.

(d) A distance between a position of the vehicle body 1 and a preset deceleration point is detected. If the vehicle body 1 reaches the preset deceleration point, a fourth control command is sent, in which the fourth control command includes a command for reducing the rotation speed of the magnetic wheel systems 3 to a preset rotation speed to stop the vehicle body 1 at a preset stop point.

In an embodiment, step (b) includes the following steps.

The permanent magnetic wheel 32 of each of the magnetic wheel systems 3 rotates to enable the conductor plates 22 to generate an induced eddy current. The induced eddy current generates a mirror-image magnetic field having an opposite direction to a rotating magnetic field of the permanent magnet wheel 32. The mirror-image magnetic field and the rotating magnetic field together generate the driving force to drive the vehicle body 1 to move.

In an embodiment, the uniform motion of the vehicle body is performed through the following steps.

The rotation speed of the magnetic wheel systems 3 are adjusted such that an equivalent linear speed of each of the magnetic wheel systems 3 is equal to a horizontal motion speed of the vehicle body 1, where the induced eddy current generated by the mirror-image magnetic field and the rotating magnetic field is zero, thereby realizing the uniform motion of the vehicle body 1.

In an embodiment, in step (d), the command for "reducing the rotation speed of the at least two magnetic wheel systems to a preset rotation speed to stop the vehicle body at a preset stop point" is performed through the following steps.

An output rotation speed of the power system 4 is reduced to allow the equivalent linear speed of the magnetic wheel systems 3 to be smaller than the horizontal motion speed of the vehicle body 1, where the driving force generated by the mirror-image magnetic field and the rotating magnetic field is converted into a braking force to decelerate the vehicle body 1 until the vehicle body stops at the preset stop point.

Described above are merely preferred embodiments of the disclosure, which are not intended to limit the disclosure. It should be understood that any replacements, modifications and improvements made by those skilled in the art without departing from the spirit and scope of the disclosure shall fall within the scope of the disclosure defined by the appended claims.

What is claimed is:

1. A magnetic levitation (maglev) train driving method based on a magnetic wheel driving device, the magnetic wheel driving device comprising a vehicle body, a guide rail system, at least two magnetic wheel systems and a power system; the guide rail system comprising two conductor plates; one of the two conductor plates being arranged at a first side of the vehicle body, and the other of the two conductor plates being arranged at a second side of the vehicle body; the at least two magnetic wheel systems being symmetrically arranged at two side walls of the vehicle body; a gap being provided between each of the at least two magnetic wheel systems and a corresponding conductor plate of the two conductor plates; the power system being configured to drive the at least two magnetic wheel systems to rotate; each of the at least two magnetic wheel systems comprising a wheel hub and a permanent magnetic wheel; the wheel hub being arranged parallel to ground; an inner ring of the wheel hub being rotatably connected to the vehicle body; the permanent magnetic wheel being arranged on an outer ring of the wheel hub; the guide rail system having a U-shaped structure; the guide rail system further comprising a rail; the rail being arranged parallel to the ground; the two conductor plates being perpendicular to the ground, and being arranged respectively at two sides of the rail; the power system comprising two motors and a transmission assembly; the two motors being arranged inside the vehicle body; the two motors being connected to the at least two magnetic wheel systems through the transmission assembly; among the at least two magnetic wheel systems, a magnetic wheel system at one side wall of the vehicle body having a rotation direction opposite to that of a magnetic wheel system at the other side of the vehicle body; one of the two motors being opposite to the other of the two motors in rotation direction; the transmission assembly being a transmission shaft; one end of the transmission being fixedly connected to an output shaft of each of the motors; and the other end of the transmission shaft being fixedly connected to each of the at least two magnetic wheel systems; and the maglev train driving method comprising:

(a) receiving a first control command, wherein the first control command comprises a command for controlling the power system to start;

(b) sending a second control command in response to the first control command, wherein the second control command comprises a command for energizing the power system; and after the power system is energized, driving the at least two magnetic wheel systems to rotate; wherein during rotation, the at least two magnetic wheel systems act together with the two conductor plates to generate a driving force to drive the vehicle body to move;

(c) detecting a speed of the vehicle body; if the speed reaches a preset speed, sending a third control command, wherein the third control command comprises a command for adjusting a rotation speed of the at least two magnetic wheel systems to allow the vehicle body to make a uniform motion at the preset speed; and (d) detecting a distance between a position of the vehicle body and a preset deceleration point; if the vehicle body reaches the preset deceleration point, sending a fourth control command, wherein the fourth control command comprises a command for reducing the rotation speed of the at least two magnetic wheel systems to a preset rotation speed to stop the vehicle body at a preset stop point;

wherein step (c) further comprises:

adjusting the rotation speed of the at least two magnetic wheel systems to accelerate the vehicle body to the preset speed;

the vehicle body is accelerated through steps of:

adjusting the rotation speed of the at least two magnetic wheel systems such that an equivalent linear speed of each of the at least two magnetic wheel systems is greater than a horizontal motion speed of the vehicle body, wherein rotation of the permanent magnet wheel allows each of the two conductor plates to generate an induced eddy current; the induced eddy current generates a mirror-image magnetic field having an opposite direction to a rotating magnetic field of the permanent magnet wheel; the mirror-image magnetic field and the rotating magnetic field together generate the driving force to make the vehicle body in an acceleration state; and the uniform motion of the vehicle body is performed through steps of:

adjusting the rotation speed of the at least two magnetic wheel systems such that the equivalent linear speed of each of the at least two magnetic wheel systems is equal to the horizontal motion speed of the vehicle body, wherein in this case, the driving force generated by the mirror-image magnetic field and the rotating magnetic field is zero, thereby realizing the uniform motion of the vehicle body.

2. The maglev train driving method of claim 1, wherein in step (d), the command for "reducing the rotation speed of the at least two magnetic wheel systems to a preset rotation speed to stop the vehicle body at a preset stop point" is performed through steps of:

reducing an output rotation speed of the power system to allow the equivalent linear speed of the at least two magnetic wheel systems to be smaller than the horizontal motion speed of the vehicle body, wherein in this case, the driving force generated by the mirror-image magnetic field and the rotating magnetic field is converted into a braking force to decelerate the vehicle body until the vehicle body stops at the preset stop point.

3. The maglev train driving method of claim 1, wherein the permanent magnetic wheel comprises a plurality of permanent magnets; and the plurality of permanent magnets are arranged in a circular Halbach period array according to a magnetization direction.

4. The maglev train driving method of claim 3, wherein the number of the plurality of permanent magnets is 16; and along a clockwise direction, a magnetization direction of the latter of two adjacent permanent magnets is set by rotating clockwise a magnetization direction of the former of two adjacent permanent magnets by 90°.

* * * * *